US009242884B2

(12) United States Patent
Hemmann et al.

(10) Patent No.: US 9,242,884 B2
(45) Date of Patent: Jan. 26, 2016

(54) METHOD FOR THE CONTROLLED OPERATION OF AN INDUSTRIAL OVEN WHICH IS HEATED IN A REGENERATIVE MANNER, CONTROL DEVICE, AND INDUSTRIAL OVEN (75) Inventors: Peter Hemmann, Cottbus (DE); Andreas Birle, Cottbus (DE); Thomas Schulz, Dobern (DE); Helmut Heelemann, Cottbus (DE)

(73) Assignee: SOFTWARE & TECHNOLOGIE GLAS GMBH (STG), Cottbus-Kiekebusch (DE)

( * ) Notice: Subject to any disclaimer, the term of this patent is extended or adjusted under 35 U.S.C. 154(b) by 356 days.

(21) Appl. No.: 13/825,281

(22) PCT Filed: Sep. 21, 2011

(86) PCT No.: PCT/EP2011/066457
§ 371 (c)(1),
(2), (4) Date: Mar. 20, 2013

(87) PCT Pub. No.: WO2012/038482
PCT Pub. Date: Mar. 29, 2012

(65) Prior Publication Data
US 2014/0011148 A1 Jan. 9, 2014

(30) Foreign Application Priority Data
Sep. 21, 2010 (DE) .......................... 10 2010 041 157

(51) Int. Cl.
*F27D 17/00* (2006.01)
*C03B 5/237* (2006.01)
(Continued)

(52) U.S. Cl.
CPC ................. *C03B 5/237* (2013.01); *C03B 5/235* (2013.01); *C03B 5/24* (2013.01); *F23L 15/02* (2013.01);
(Continued)

(58) Field of Classification Search
CPC ............................ C03B 5/237; F27B 2014/146

USPC ............ 432/28, 179, 180, 181, 182; 165/4–8; 422/173–179; 110/210; 431/215; 126/91 A
See application file for complete search history.

(56) References Cited

U.S. PATENT DOCUMENTS 3,015,357 A  1/1962  Bain et al.
3,170,678 A * 2/1965  Keefer ............................ 432/28
(Continued)

FOREIGN PATENT DOCUMENTS

CN    101115955 A    1/2008
DE    143 158 A1     8/1980
(Continued)

OTHER PUBLICATIONS

Hemmann et al., "Advanced combustion control: the basis for $NO_x$ reduction and energy saving in glass tank furnaces," *Glass Science and Technology* 77(6):306-311, 2004.

*Primary Examiner* — Gregory A Wilson
(74) *Attorney, Agent, or Firm* — Seed IP Law Group PLLC (57) ABSTRACT

The invention relates to a method for the controlled operation of an industrial oven which is heated in a regenerative manner and which comprises an oven chamber, in particular a melting tank, in particular for glass, having the following steps: injecting fuel into the oven chamber via at least one fuel injector, which is designed to inject fuel, practically without combustion air in particular, conducting combustion air to the oven chamber in a first period duration and conducting exhaust gas (AG) out of the oven chamber in a second period duration separately from the fuel in a periodically alternating manner by means of a left regenerator and right regenerator which are associated with the at least one fuel injector and which are designed to regeneratively store heat from the exhaust gas and transmit heat to the combustion air. A supply of the combustion air is automatically controlled by means of a control loop. The control loop takes into account an excess air coefficient that is specified in the method as well as the location of the entrance of the excess air upstream, in, or downstream of the air-side regenerator. A corresponding control device and an industrial oven which comprises such a control device and which is heated in a regenerative manner are likewise claimed.

21 Claims, 3 Drawing Sheets

(51) Int. Cl.
*C03B 5/235* (2006.01)
*C03B 5/24* (2006.01)
*F23L 15/02* (2006.01)
*F23N 3/00* (2006.01)
*F23N 5/00* (2006.01)
*F23N 5/20* (2006.01)
*F23N 5/24* (2006.01)

(52) U.S. Cl.
CPC ............... *F23N 3/002* (2013.01); *F23N 5/003* (2013.01); *F23N 5/006* (2013.01); *F23N 5/203* (2013.01); *F23N 5/242* (2013.01); *F23N 2021/08* (2013.01); *F23N 2023/36* (2013.01)

(56) References Cited

U.S. PATENT DOCUMENTS

| | | | |
|---|---|---|---|
| 4,394,122 A * | 7/1983 | Bueno et al. | 432/30 |
| 4,528,012 A | 7/1985 | Sturgill | |
| 4,756,688 A | 7/1988 | Hammond et al. | |
| 4,874,311 A * | 10/1989 | Gitman | 432/13 |
| RE33,814 E * | 2/1992 | Bradley et al. | 432/181 |
| 5,569,312 A * | 10/1996 | Quirk et al. | 65/134.6 |
| 5,695,002 A * | 12/1997 | Tanaka et al. | 165/10 |
| 2014/0011148 A1* | 1/2014 | Hemmann et al. | 432/30 |

FOREIGN PATENT DOCUMENTS

| | | |
|---|---|---|
| DE | 223 230 A1 | 6/1985 |
| DE | 36 10 365 A1 | 5/1987 |
| DE | 283 198 A5 | 10/1990 |
| DE | 195 21 513 A1 | 12/1996 |
| DE | 10 2005 019 147 A1 | 10/2006 |
| EP | 0 657 390 A2 | 6/1995 |
| JP | 60-231422 A | 11/1985 |
| JP | 6-239618 A | 8/1994 |
| JP | 8-208240 A | 8/1996 |
| JP | 2012-515700 A | 7/2012 |
| WO | 2010/083900 A1 | 7/2010 |

* cited by examiner

METHOD FOR THE CONTROLLED OPERATION OF AN INDUSTRIAL OVEN WHICH IS HEATED IN A REGENERATIVE MANNER, CONTROL DEVICE, AND INDUSTRIAL OVEN

BACKGROUND

1. Technical Field

The invention concerns a method for the regulated operation of a regeneratively heated industrial furnace, in particular, with a melting tank, in particular for glass, as well as a control device that is formulated for the execution of the method. The invention also concerns an industrial furnace.

2. Description of the Related Art

In principle, an industrial furnace is not restricted to the use in the production of glass. For example, an industrial furnace of the type named in the introduction can also be used in the production of metal or similar products. A regenerative industrial furnace of the type named in the introduction has, however, proven itself to be particularly suitable in glass production for the melting of glass.

Thus far, the control of the regenerative glass melting furnace—that is, regularly by means of control via the upper furnace as a control path—has been entrusted exclusively to PID controllers, the goal of which is the control of an upper furnace temperature, and the output of which represents either a quantity of fuel itself or else a quantity of combustion air which the quantity of fuel then follows in an adjustable relationship.

What is problematic with this is that in actuality, such temperature regulators regularly prove themselves to be unsuitable for regulating the temperature of a regenerative glass melting furnace in a successful, stable manner, and to that extent, they remain unused. The first reason lies in the design of the control that has been followed thus far, which has an inherent systematic tendency to expand slight temperature differences between the regenerators further and further. Within that context, the use of fuel between the flame sides also increases further and further, without a nominal value of the furnace temperature ever being reachable, that is, the control does not converge upon the nominal value of a furnace temperature.

From DE 36 103 65 A1, a method is known for the technologically controlled regulating of an upper furnace heater of an industrial furnace with which a fuel stream is provided for the control of a vault temperature of the upper furnace, and the problem of a regenerative lateral asymmetry is left to subjective influences. It was found that temperature differences in the furnace temperatures between heating on the left and heating on the right have their cause to a predominant degree in the corresponding temperature differences of the associated regenerators. In individual cases, peak temperatures of the left regenerator can be around 45° C. lower than those of the right regenerator, and at the same time, the temperatures in the furnace chamber—that is, regularly in the upper furnace—can be around 20° C. lower with heating on the left than the same temperatures with the heating on the right.

What is desirable is a technological control concept that essentially converges on a nominal value of the furnace temperature and in particular rectifies the problem of the lateral asymmetry through regulation technology.

A second reason lies in the fact that conventional regulation methods incorrectly take for granted that an uncontrolled admission of air is constant, or else they correct the supply of combustion air exclusively on the basis of a measured value of residual oxygen that is measured either manually or continuously which, however, as a result of its non-linear context with the combustion air, cannot achieve any optimal control dynamics. In particular, this approach cannot evaluate the range of substoichiometric heating because from a comparison of different process states each with 0% residual oxygen, no sensible action in terms of control technology can be justified any longer.

A third reason lies in the fact that conventional control methods do not take into consideration the special requirements of regenerative heating with which the combustion air, in addition to its function as an oxygen carrier for the combustion, likewise serves as a transport medium for the heat from the regenerator into the furnace chamber. Therefore, for the compensation in terms of control technology of uncontrolled entry of false air, it makes a difference whether the uncontrolled false air that is to be compensated for has entered before the regenerator—and therefore participates in the heat transport—or whether it only enters after the regenerator—and thus only heats the regenerator on one side on the exhaust gas side with additional exhaust gas heat, and therefore disrupts the thermal symmetry of the regenerators.

The so-called "ratio control" between the fuel stream and the combustion air stream is widespread and common in practice. Within that context, either the quantity of combustion air follows the fuel in an adjustable relationship or, conversely, the fuel stream follows the quantity of combustion air in an adjustable relationship.

In that regard, the ratio specifications are empirically set in such a way that in the exhaust gas stream, a residual oxygen value is set that is estimated as optimal.

What is problematic with this is at minimum that uncontrolled entries to or escapes from the combustion air stream are taken for granted as either not present or else as constant. As has been explained above, though, this condition is not present.

Rather, in regeneratively heated glass furnaces, typically up to 10% of all of the air that arrives for combustion penetrates in an uncontrolled manner into the regenerators or the furnace chamber as false air, whereby the supply of uncontrolled false air is in no way constant, but rather is influenced by the furnace pressure, temperatures, and other operating parameters. Losses of uncontrolled false air are likewise observed, for example by the short circuit flow of combustion air directly in the exhaust gas stream in the case of a leaky reversing blade.

Such deficiencies cannot be compensated for by so-called "cross limit ratio controls" with which the combustion air follows the maximum of the nominal value and the process value of the fuel in an adjustable relationship and, conversely, the fuel is limited if less air is available than would correspond to the air ratio that was set. Because this method also tacitly and incorrectly presupposes that uncontrolled false air is either not present or is supplied constantly.

One known approach to the solution of the problem is provided by a method indicated as "oxygen trimming" with which the empirical correction of the air ratio is replaced by an automatic correction which is oriented to the difference between a target value and a continuously measured value for the residual oxygen content in the exhaust gas.

However, this method can only be used in the case of an oxidizing firing, that is, as long as sufficient residual oxygen is still available. The method of "oxygen trimming" is tied to the disadvantage that a non-linear relationship exists between the residual oxygen value in the exhaust gas and the associated value of the combustion air stream which considerably affects the dynamics of such a regulation.

The method known as "lambda control" is known from the control of internal combustion engines, in particular in automotive engineering, with which the mixture of fuel and air is automatically corrected in such a way that the nominal value for the measuring result of a lambda probe in the exhaust gas is carried out downstream from the engine.

An improved control concept for an industrial furnace of the type mentioned in the introduction is desirable in consideration of the long reaction times that are typical for the regenerative heating of industrial furnaces between a change in the air ratio and the measurable change as a result in the measured value of an exhaust gas analysis measurement. In the end, this is caused as a result of the significantly higher volume of the regenerator and the furnace chamber in comparison with an internal combustion engine. Therefore, an insufficiently simple transfer of a method from automotive engineering to an industrial furnace runs into considerable problems in the control dynamics. In particular, neither the method of "oxygen trimming" nor the "lambda control" that is known from automotive engineering take into consideration the periodicity of regenerative heating or firing with a regenerative industrial furnace of the type mentioned in the introduction. Instead of that, typical recurring trend patterns of the uncontrolled entry of false air or of the uncontrolled false air escape can be observed with a regeneratively fired industrial furnace which cannot be compensated for or can only be incompletely compensated for by a slow, gradual correction of the air ratio, while a fast correction of the air ratio fails because of unfavorable control dynamics.

BRIEF SUMMARY

With regard to the method, the problem is solved by the invention with a method of the sort mentioned in the introduction with which the features of the characterizing portion of Claim 1 are provided inventively. The invention leads to the solution of the problem of a control device according to Claim 16 and of an industrial furnace according to Claim 18.

Embodiments of the present invention are directed to an industrial furnace having a control device and a corresponding method of operation. The fuel for the industrial furnace is to be understood in particular as fuel gas, although other fuels such as oil or similar fuels are likewise possible for the operation of an industrial furnace. The injector is to be understood in particular as an injection device that is formulated to inject fuel immediately in front of a furnace chamber in a supply passage or in the furnace chamber, in particular separately from the combustion air. A mixture of combustion air and fuel is provided in the furnace chamber. The furnace chamber has in particular an upper furnace and a lower furnace. A lower furnace has in particular a glass melting tank or similar device.

The designations of the regenerators as the left regenerator and the right regenerator are not to be understood as restrictive with regard to their location arrangement and follow the general technical language usage. The designations can also be chosen differently, for example, as a first and second regenerator.

The regenerators may also be arranged with regard to a glass melting tank in the flow direction or across the flow direction of the glass. One single regenerator may be assigned to a number of injectors. A regenerator may also be understood as a section of a regenerator or a similar device which is assigned to a single injector.

Embodiments build upon available furnace temperature regulation methods. One embodiment of the invention starts out from the consideration that for an industrial furnace, the combustion air, in addition to its function of supplying oxygen for the combustion, also has the function of absorbing heat from the regenerator and transporting it into the furnace chamber. An uncontrolled entry of false air in a regeneratively heated industrial furnace therefore leaves behind not only the influence upon the residual oxygen value in the exhaust gas, but also a thermal trail in the regenerators. In particular, in an additional embodiment of the invention, it was recognized that this is recognizable in the thermal symmetry or asymmetry of the regenerators. In particular, from the interpretation of this thermal trail, it becomes recognizable whether the uncontrolled entry of false air has taken place before or after the air-side regenerator. An indication of false air is provided in order to permit a case differentiation which, depending upon the origin of the false air, desires different responses and limitations in terms of control technology in order to take into account the heat transport function of the combustion air.

It is a substantial deficiency of all known control methods that they do not take into consideration the thermal trail of the uncontrolled air and its entry point before or after the regenerator. However, indication errors in the measuring of combustion air quantities as well as losses of air at the supply of the measured and regulated combustion air occur as positive or negative contributions to the appearance of the uncontrolled false air. In additional embodiments, they are to be concretely determined from the thermic behavior and from the course of the measurement data of the continuous exhaust gas analysis and are to be taken into consideration with the selection of the reaction in terms of control technology and the necessary limitations.

None of the approaches that are known thus far in the prior art takes into consideration the requirements that are recognized in this case which result from the properties of the regenerative heating.

One or more embodiments of the invention has recognized that a method for the regulation of the supply of combustion air to regeneratively heated industrial furnaces should be based in particular upon the continuous analysis and compensation of uncontrolled losses of false air or uncontrolled entry of false air for combustion. This applies in particular with glass melting furnaces with the goal of a regulated, near-stoichiometric heating or even a regulated substoichiometric heating with a constant nominal value that can be set of the excess air quantity lambda. According to an embodiment of the invention, a false air indication indicates whether uncontrolled false air should be or may be compensated for through the adaptation of the combustion air or whether it should be or can be inhibited by means of increased furnace pressure.

Within the framework of an especially preferred additional embodiment, it has proven to be advantageous for the false air indication to use an output of an active symmetry regulation for the compensation of the thermal asymmetry of the regenerators, that is, to use an output as a criterion as to whether uncontrolled air may be compensated for by means of an adaptation of the combustion air or whether it can only be inhibited by means of increased furnace pressure. The first control element is preferably formulated as a means for a choke in the supply of combustion air that is formulated for the regulation of the flow quantity of the combustion air. The second control element is preferably formulated as a blade, for example as a reversing blade in the drawing off of exhaust gas that is formulated for the building up of a counterpressure to the furnace pressure.

In an especially preferred additional embodiment, the method for the automatic regulation of the supply of combustion air to the regenerative industrial furnace, in particular to a regeneratively fired glass melting tank, it is provided that the combustion air stream is automatically regulated by a PID controller that is known in and of itself, the nominal value of which is formulated from the product of the quantity of fuel, the stoichiometric air requirement of this fuel, and an excess air value lambda that is provided as a target value, minus the quantity of the uncontrolled entry of false air from outside of the industrial furnace that is preferably determined continuously, whereby the uncontrolled entry of false air is preferably determined continuously by means of the calculation of the combustion on the basis of exhaust gas analyzers that preferably work continuously. An analyzer is in particular formulated in the form of a lambda probe which is preferably executed as a zirconium oxide probe that is already known in and of itself. Provided with a special advantage, the excess air value lambda ($\lambda_{SOLL}$) of the combustion air that is provided as a target value is divided by the quantity of fuel and, in this way, a continuously corrected air to fuel ratio is formed which is supplied to the $\lambda$ controller of the control loop. For the improved determination of the excess air index, it is in particular advantageous to formulate air ratios for several fuels that are used simultaneously in such a way that they are in relationship with each other to the stoichiometric air requirement of each fuel. Through this, it is advantageously possible to maintain the unchanged oxygen supply with a change in the proportion of the fuels. For example, for the avoidance of the disadvantages of conventional methods, the process value for the actual excess air, expressed in the excess air value lambda as a process value, can first of all be determined from the results of a continuous exhaust gas analysis, for example at a regenerator head with the measured values $O_2$ % and CO % with the use of a combustion calculation:

$$\text{PV\_lambda} = 1 + const.1 * \frac{O2\%}{20.94\% - O2\%} - const.2 * \frac{CO\ \%}{CO2\% + CO\ \%}$$

Within that context, the properties of the fuel and also the influence of the $CO_2$ from the splitting of the carbonates that are contained in the raw batch can be contained in the constants const. 1 and const. 2.

In contrast to the residual oxygen $O_2$ %, the process value (actual value) PV_lambda that is obtained in this way is also equally suitable for the evaluation and regulation of the combustion relationships in the substoichiometric range, that is, even with PV_lambda<1, and is in a linear relationship to the air quantities over the entire range that is technologically interesting. As a result of this linearity, it makes possible a clearly better and more accurate regulation as a regulation that is oriented to the residual oxygen value $O_2$ %.

In this way, the sum of the uncontrolled losses of false air and the uncontrolled entry of false air can be explicitly provided as the disturbance variable of the regulation, for example as $$XF=\text{PV\_lambda}*L_{MiN}*\text{fuel stream}-\text{PV\_combustion air}$$

with the process value PV_combustion air of the regulated combustion air stream and the stoichiometric minimum air LMIN of the fuel dependent only upon the chemical composition of the fuel.

The variable XF that is indicated as false air contains here the sum of all disturbances and foreign influences on the combustion air balance.

The disturbance variable false air XF is preferably to be determined continuously as a process variable and—with a suitable false air indication—is to be inhibited to the greatest degree possible by means of high furnace pressure and sealing or else the remaining, unavoidable portion is to be analyzed for its origin in order to determine permissible control limits. A nominal value of the combustion air that has been determined is advantageously divided by the quantity of fuel in order to in this way formulate a continuously correct air-fuel ratio which can be supplied to a conventional air ratio regulation.

Additional Embodiments

A first adjustable control variable in the form of a fuel stream and/or a combustion air stream is preferably additionally set in another control loop for a temperature regulation through a furnace chamber temperature as a control variable and through a first regulator, in particular a PID controller, for the furnace chamber temperature as well as through a control element that is assigned to the first regulator. In particular, it has proven to be advantageous that in a second control loop for a symmetry regulation concerning the left and right regenerators, a second adjustable control variable is set in the form of a heat transfer variable that influences the heat transfer between the first and second regenerator through a first preheating parameter that is significant for the heat content of the combustion air of the first regenerator and a second preheating parameter that is significant for the heat content of the combustion air of the second regenerator and through a second regulator for the difference between the first preheating parameter and the second preheating parameter, as well as through a control element that is assigned to the second regulator.

Within the framework of an implementation of this additional embodiment that is especially advantageous, the second adjustable control variable in the form of a heat transfer variable that influences the heat transfer between the first and second regenerator is set in order to restrict the amount of a difference between the first and second preheating parameter to a value within a threshold value close to zero.

A first time span can be advantageously set as the heat transfer variable by which for the hotter of the first or second regenerators, the first cycle duration is extended and/or for the colder of the first or second regenerators, the first cycle duration is shortened.

A second time span can be additionally or alternatively set as the heat transfer variable by which for the colder of the first or second regenerators, the second cycle duration is extended and/or for the hotter of the first or second regenerators, the second cycle duration is shortened. In particular, with a combination, the first and second time spans can be the same amount.

In particular, on the basis of the aforementioned concepts from additional embodiments, information is obtained from the observation of the thermal symmetry of the left regenerator and the right regenerator about whether the uncontrolled entry of air takes place in the base area of the air-side regenerator or only in the furnace chamber itself. Within that context, the reaction to uncontrolled false air in the regenerator base leaves the thermal symmetry between the left regenerator and the right regenerator unaffected or even improves it. In the case of the uncontrolled entry of false air into the furnace chamber, however, the symmetry of the regenerator temperature is visibly affected. Therefore, with the suitable false air indication, the method is advantageously suitable for the regulation of an industrial furnace without affecting this symmetry.

This approach is in particular supported advantageously in that a minimum value of the furnace pressure is maintained as a stability limit, whereby if the value drops below the stability limit, a reduction in the combustion air stream leads to a higher drawing off of uncontrolled false air, while for the furnace pressure values above the stability limit, the uncontrolled false air is not affected or is only insignificantly influenced by a combustion air stream of a different degree.

In addition, it has also proven to be advantageous to limit a minimum quantity of the regulated combustion air stream in such a way that a temperature of the air-side regenerator remains below a prescribed temperature threshold value.

In particular, a symmetry regulation by means of the automatic offset of the cycle times of the firing between the left regenerator and the right regenerator can be used as a criterion for the thermal symmetry of the regenerators. The use of the aforementioned additional embodiment can, for example, make a lengthy, lasting offset of the cycle times between the left flame side and the right flame side in order to keep the regenerator head temperatures symmetrical for both flame sides. This circumstance can be used in an advantageous additional embodiment as a false air indication. With a correct false air indication, this prevents an excessive enlargement of the temperature differences between the regenerator sides and therefore a greater offset of the cycle times in order to maintain the symmetry. Consequently, the difference between the first preheating parameter and the second preheating parameter is preferably used as a control result of the second control loop within the framework of the false air indication for the evaluation of an uncontrolled air penetration in the furnace chamber and/or the regenerator. In particular, this can also be used for the additional evaluation of the state of the regenerator and/or for the evaluation of an additional independent variable. For example, the false air indication can recognize that false air enters downstream after the air-side left and/or right regenerator, in particular in the furnace chamber, for the case that a heating up of the regenerator is present on a time scale that repeatedly exceeds the cycle duration on average. This is the case in particular if on average, the first cycle duration is extended and/or the second cycle duration is repeatedly shortened for the first regenerator.

On top of that, within the framework of the false air indication from the observation and/or analysis of the trend in terms of time of the quantity of uncontrolled air during the time of a firing cycle of the regenerative heating, characteristic and periodically recurring trend patterns can be advantageously determined and used in particular for the smoothing of the running process values of uncontrolled air and for the regulation for the future.

For example, the influence of a systematic measuring error of the combustion air stream on the determination of the uncontrolled air supply by means of the comparison of two or more states of operation with a different use of fuel can be eliminated. Within that context, the measuring of the quantity of combustion air is to be corrected in such a way that for different states of operation, the analysis of the combustion air yields equal amounts or amounts that are only slightly different of uncontrolled air supply.

In particular, the uncontrolled air supply also includes the uncontrolled air loss. For example, this can occur by means of leaky reversing mechanisms with which a part of the combustion air enters into the exhaust gas stream in the short circuit flow. Such air losses are preferably recognized through a trend that is falling in terms of time over the duration of the regenerative cycle or a suddenly occurring strong reduction in the value of the uncontrolled air up to negative values of the same in the wake of the reversal procedure between the flame sides.

Embodiments of the invention shall be explained below by means of the drawings. These are not to necessarily represent the embodiments only to scale; rather, where it serves the explanation, the drawing has been executed in a schematic and/or slightly distorted form. With regard to additions from the teachings that are immediately recognizable from the drawings, reference is made to the relevant prior art. Within that context, it is to be taken into consideration that widely varied modifications and changes concerning the form and the detail of an embodiment can be made without deviating from the general idea of the invention.

The features of the invention that are disclosed in the description, in the drawings, and in the claims can be essential both individually and in any combination for the additional embodiment of the invention. In addition, also falling within the framework of the invention are all combinations of at least two of the features that are disclosed in the description, the drawings, and/or the claims. The general idea of the invention is not restricted to the exact form or the details of the preferred embodiment that is depicted and described below, nor is it restricted to a subject matter that would be limited in comparison to the subject matter that is claimed in the claims. With measurement ranges that are indicated, values that also lie within the cited limits are to be disclosed as limiting values and can be used and claimed as desired.

BRIEF DESCRIPTION OF THE SEVERAL VIEWS OF THE DRAWINGS

Additional advantages, features, and details of the invention result from the following description of the preferred embodiments as well as through the use of the drawings; these depict in.

DETAILED DESCRIPTION

Figure 1:
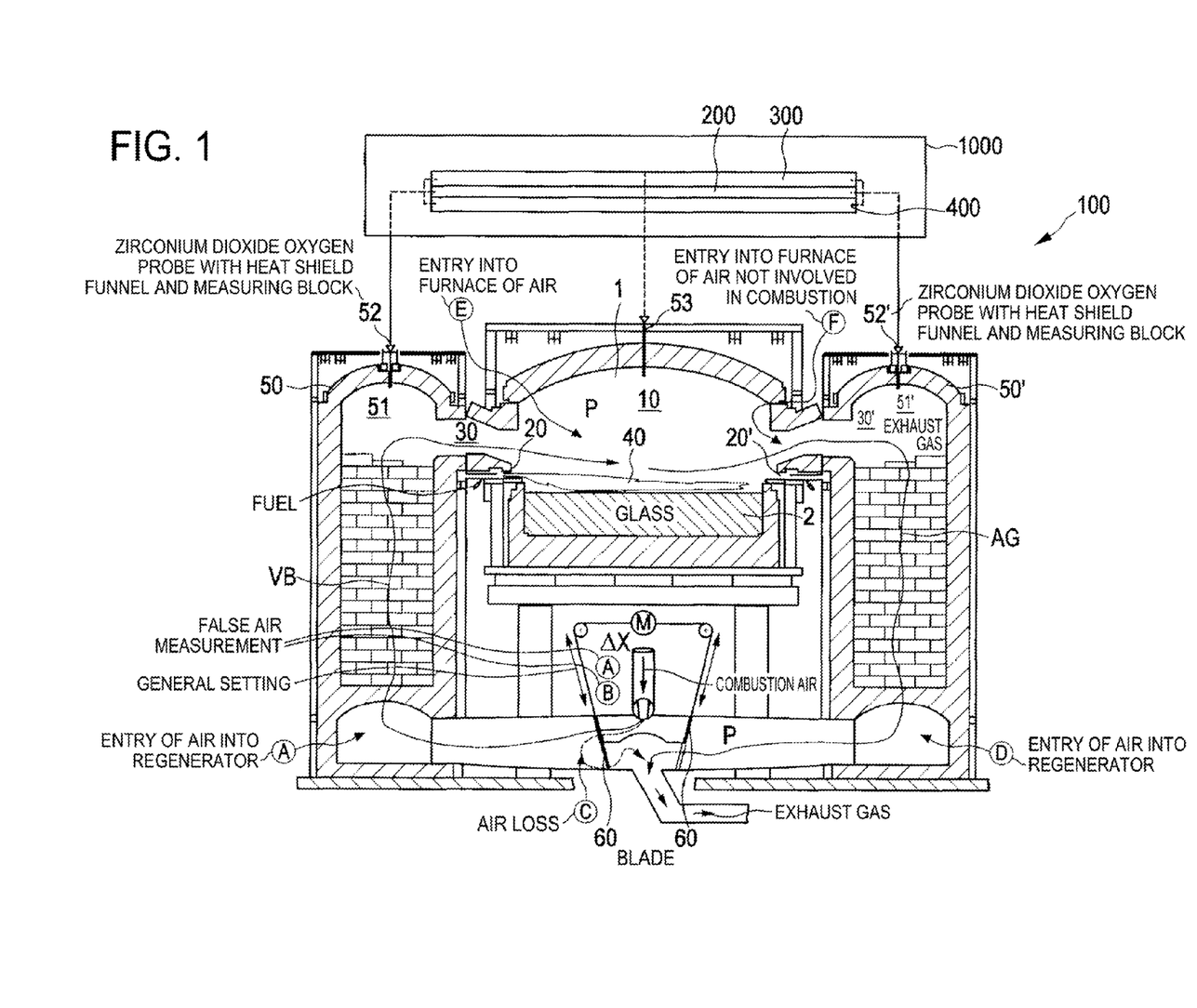
FIG. 1 shows a schematic representation of a regeneratively heated industrial furnace with a left regenerator and a right regenerator according to an especially preferred embodiment with which a control device is provided with a λ control module according to an embodiment of the invention.

FIG. 1 depicts in a simplified representation a regeneratively heated industrial furnace 100 with a furnace chamber 10 whose upper furnace chamber 1 is regulated as a control path and with which the lower furnace chamber 2 has a glass melting tank which is not depicted in greater detail. Glass that is contained in the glass melting tank is heated via the furnace chamber 10 above the melting temperature and is melted for the production of plate glass or a similar product and then suitably treated. The industrial furnace 100 is warmed in this case by fuel, in this case in the form of fuel gas, being injected into the upper furnace 1 via a plurality of fuel injectors 20 that have been applied laterally. From the fuel injectors 20, in this case a left injector 20 has been depicted. From the fuel injectors 20', in this case a right injector 20' has been depicted. For the sake of simplicity, the same reference numbers will be used below for parts that are the same or similar or those with the same function or a similar function. For example, there are six injectors on the left side and six on the right side that are provided with 20 and 20', respectively. In the firing cycle that is depicted in FIG. 1, fuel gas is injected into the upper furnace 1 via a fuel injector 20 practically without combustion air. Above the fuel injector 20, preheated combustion air VB is supplied via a left side opening 30 to the upper furnace 1. The combustion air from the opening 30 mixes in the upper furnace 1 with the fuel gas that was injected from the fuel injector 20 and leads to the formation of a flame 40 that covers the lower furnace, which in this case is represented symbolically. The image of FIG. 1 depicts the industrial furnace 100 in the state of a regenerative firing via the left regenerator 50 and the left injectors 20. These and the opening 30 are formulated in such a way that the fuel gas that is supplied via the injectors 20 is mixed in a sufficiently near stoichiometric or substoichiometric range with combustion air VB from the left regenerator in the upper furnace 1. The state of operation that is depicted in FIG. 1 of a left side firing of the upper furnace 1 with the injection of fuel gas via the left side injectors 20 and the supply of combustion air VB via the left regenerator 50 lasts for a first cycle duration of, for example, 20 to 40 min. During this first cycle duration, the combustion air VB is supplied to the upper furnace 1 in the furnace chamber 10 separately from the fuel injector 20. During the first cycle duration, exhaust gas AG is led from the upper furnace 1 via the right side openings 30 to the right regenerator 50 and heats it.

In a second state of operation, the firing of the upper furnace 1 is reversed for a second cycle duration of a similar length of time. In addition, the combustion air VB is then led via the right regenerator 50' to the upper furnace 1 along with fuel gas from the right injectors 20', whereby the combustion air VB than absorbs the heat that was deposited by the exhaust gas AG in the first cycle duration in the regenerator 50'.

The regulation of a fuel stream and/or a combustion air stream fundamentally takes place via a temperature regulation module 400 of a control device 1000 for the industrial furnace 100. In addition, a PID controller can in principle be used in the temperature regulation module 400, according to which with the increase of the fuel stream and/or the combustion air stream, a furnace chamber temperature is increased or else with the reduction of a fuel stream and/or a combustion air stream, a furnace chamber temperature is reduced. Temperature values of the regenerator head 51 or 51' or of the upper furnace chamber 1 are supplied via suitable temperature probes 52, 52', 53 to the temperature regulation module 400; in this case, these temperature probes are in any case also in part combined with a suitable lambda probe for the measurement of a fuel-air ratio.

In addition, the control device 1000 has a symmetry regulation module 300 which in this case is formulated to influence the heat transfer between the first and second regenerators 50, 50'. In this case, this takes place via a heat transfer variable in the form of a time span ±Δt by which for the colder of the first regenerator 50 and the second regenerator 50', the second cycle duration t is extended and/or for the hotter of the first regenerator 50 and the second regenerator 50', the second cycle duration t is shortened, or also for the colder of the first regenerator 50 and the second regenerator 50', the first cycle duration t is shortened and/or for the hotter of the first regenerator 50 and the second regenerator 50', the first cycle duration t is extended. A suitable control element in the form of a timer is in this case coupled with the symmetry regulation module 300 and is capable of shortening or extending the first and second cycle duration t according to the symmetry regulation module 300; in this case, this can therefore displace the cycle duration by the time span ±Δt with the left regenerator 50 or the right regenerator 50'.

Furthermore, that which is available for the automatic regulation of the combustion air supply of the regenerative industrial furnace 100 with a regeneratively fired glass melting tank provides that the combustion air stream is automatically regulated by a PID controller of a λ control module 200 that is already known in and of itself. The nominal value of the PID controller is formulated from the product of the quantity of fuel, the stoichiometric air requirement of this fuel, and an excess air value $\lambda_{SOLL}$ that is provided as a target value minus the continuously determined quantity of uncontrolled air supply from outside of the industrial furnace. The uncontrolled air supply is continuously determined by means of a combustion calculation on the basis of a continuously operating exhaust gas analyzer which in this case is formulated in combination with the temperature probes 52, 52', 53 by zirconium oxide probes that are already known in and of themselves. With operating temperatures between 700 and 1,500° C., zirconium probes achieve an operating life of approx. 3 years, and in best cases up to 8 years.

Good service lives are also achieved under at times extremely reducing conditions or with exhaust gas impurities through oxides of heavy metals. Decisive for this is not only the robust, industrially suited implementation, but also above all else regular maintenance. Thus the measurement signal from the zirconium dioxide probes is sufficiently stable and reproducible to serve as the basis for an automatic regulation.

A regulation as explained above by means of the λ control module 200 shall hereinafter be referred to as a "lambda control". The excess air value λ is fundamentally defined as the relationship of the actually available air—that is, the controlled quantity of air plus the false air—divided by the stoichiometric minimum air requirement for the current quantity of fuel.

$$lambda = \frac{\text{measured combustion air quantity} + \text{false air}}{\text{stoichiometric minimum air}}$$

The current process value λ is directly determined from the measurement results (mV) by the zirconium oxide probe, including for mixed fuel operation such as gas and oil, including in the substoichiometric range of λ<1. Within that context, cell voltages from zero to 200 mV are a measurement for a decreasing oxygen content of 20.94% down to 0%, while on the other hand, increasing cell voltages from 200 mV to 800 mV in the progressively reducing range are a measure of an increasing share of CO.

A precondition for the determination of the process value λ from the measurement result from the zirconium oxide probe is the knowledge of the chemical composition of the fuel. Gas chromatographs are only available on-line in luxurious exceptional cases. For varying heating values, a characteristic composition of the fuel is deposited as an "operating point" and is carried along proportionally with other heating values. Building upon that, a combustion calculation provides a non-dimensional fuel index—for gas as well as for oil—and subsequently the actual quantity of air, the quantity of exhaust gas, the components of the exhaust gas, and—of actual interest in this case—the false air XF as a difference between air determined by probes and the controlled air stream.

Unlike the measured value of $O_2$ %, the measured process value λ is available in the entire technologically interesting range of 1.5>λ>0.96 and behaves in a directly linear manner to the surplus or lacking combustion air. That makes possible an efficient regulation which can accurately determine the lacking or surplus air without struggling with the time relationship of a control path. The nominal value $λ_{SOLL}$—which is non-linearly convertible into the desired $O_2$ % value and vice versa—is compared with the process value $λ_{IST}$.

With the embodiment in this case, the lambda control fundamentally signifies:

Currently determining and making visible the false air
Inhibiting or reducing the false air
Compensating for unavoidable false air.

Which value is the optimal one depends upon the properties of the combustion chamber and the requirements of the melting charge—in most cases, a lambda value between around 1.04-1.05 is a good value—which corresponds to $O_2$ % values between 0.8 and 1.0%.

In order to avoid the disadvantages of the conventional methods the process value for the actual excess air, expressed as the excess air value λ as a process value (actual value), is first of all concretely determined from the result of a continuous exhaust gas analysis at the regenerator head with the measured values $O_2$ % and CO % with the use of a combustion calculation.

$$PV\_lambda = 1 + const.1 * \frac{O_2\%}{20.94\% - O_2[\%]} - const.2 * \frac{CO\ \%}{CO_2\% + CO\ \%}$$

whereby the properties of the fuel and also the influence of the $CO_2$ from the splitting of the carbonates that are contained in the raw batch are contained in the constants const. 1 and const. 2.

In contrast to the residual oxygen $O_2$ %, the process value PV_lambda that is obtained in this way is also equally suitable for the evaluation and regulation of the combustion relationships in the substoichiometric range, that is, with PV_lambda<1, and is in a linear relationship to the air quantities over the entire range that is technologically interesting. As a result of this linearity, it makes possible a clearly better and more accurate regulation as a regulation that is oriented to the residual oxygen value $O_2$ %.

In this way, the sum of the uncontrolled losses of air and the uncontrolled entry of air can be explicitly provided as the disturbance variable of the regulation as $XF$=PV_lambda*$L$MIN*fuel stream−PV_combustion air with the process value PV_combustion air of the regulated combustion air stream and the stoichiometric minimum air LMIN of the fuel dependent only upon the chemical composition of the fuel.

The variable XF that is indicated as false air contains the sum of all disturbances and foreign influences on the combustion air balance.

The disturbance variable false air XF is in this case continuously determined as a process variable. This can then be inhibited to the best possible degree by high furnace pressure and the sealing of the furnace and the remaining unavoidable portion can be analyzed for its origin in order to determine the permissible control limits.

First of all, continuing to make reference to FIG. 1, an online analysis of the sources of the false air can take place for a technological regulation method with the evaluation of the short-term and long-term trends of the λ signals and of the trail of the false air in the furnace and regenerator. Sources of false air may be:

(A) Inaccuracies in the measurement of the combustion air stream or the quantity of fuel have an effect on calculation as a deviation from the combustion air balance just as the actual false air does, they have precisely the same effect on both flame sides, and they become visible in the comparison of different operation points of the installation with the use of significantly different fuels.

(B) "Drifting false air", for example from increasing contamination and an increasing lower indication of the measurement of the quantity of the combustion air have an effect like false air and can thus also be correctly compensated for.

The influence of a systematic indication error of the measurement of the quantity of the combustion air (A) and (B) on the disturbance variable XF is by nature identical for both flame sides and is determined by means of the comparison of two or more states of operation with the use of different fuels. Such a systematic indication error for the measurement of the quantity of the combustion air is to be remedied by means of correction and can also be compensated for up to elimination by means of adaptation of the combustion air.

(C) A loss of air—that is, a short circuit flow in a part of the combustion air through a leak in the reversing blade directly into the exhaust gas stream—manifests itself through negative false air values plus a decreasing trend of the lambda value over the flame period, typically also occurring as different by side or sporadically with the alternation procedure, although not with every one.

It has been found that a loss of air (C) that is cause by a leaky reversing blade can be identified by a falling trend in the process variable oxygen or false air. A loss of air is to be remedied by means of the sealing of the reversing blade and can be compensated for up to the sealing without limitation by the adaptation of the combustion air.

(D) The entry of false air into the regenerator typically differs by side and occurs in the chamber base area—the greatest low pressure prevails there with approximately −20 Pa, that is, the false air that occurs here is also warmed or cools in the same way as the regularly measured combustion air.

As a result of this, an entry of uncontrolled air into the regenerator base (D) is to be identified such that through the changed quantity of combustion air, its compensation does not cause any disruption of the symmetry between the left regenerator and the right regenerator, but rather on the contrary, it improves the thermal symmetry of the regenerators. The portion of this that is inevitable which cannot be avoided by means of a sealing of the regenerators can be compensated for without restriction by means of an adaptation of the combustion air.

(E) An entry of false air into the furnace chamber can be different for the flame side as a result of an influencing pressure field. It is fundamentally also possible that this flame side is the same; in the case of a different entry of false air on the flame side into the upper furnace, this leads to a further increase in the thermal asymmetry in the case of air compensation. Independently of whether the entry of false air takes place differently for the flame side or the same for the flame side, a compensation for false air leads to a regenerator temperature which on average is rising: cold air that does not participate in the warming in the regenerator removes heat from the furnace chamber and enters the opposite regenerator as hot exhaust gas—it manifests itself through an increase in the regenerator temperatures.

(F) The less that this air then also participates in the combustion, the more significant the negative effect becomes.

An entry of uncontrolled air into the furnace chamber (E) and (F), on the other hand, causes a typical disruption in the symmetry of the regenerator temperatures between the left regenerator and the right regenerator; the attempt to compensate for such uncontrolled air in the furnace chamber XF by means of the adaptation of the quantity of combustion air leads to the increase in the thermal asymmetry of the regenerators and to the raising of the regenerator temperatures. As a result of the thermal trail in the regenerator, the entry of uncontrolled air into the furnace chamber is to be identified and may not be compensated for or may only be compensated for within narrow limits by means of the adaptation of the combustion air; it can only be diminished by the sealing of the furnace chamber and by increasing the furnace pressure.

To summarize, for all of the forms of false air (A) to (D) that have their effect upstream before the regenerator, it holds true in general that the causes are preferably to be recognized and remedied. For all false air that cannot be avoided, the automatic compensation by means of adaptation to the quantity of combustion air is the technologically appropriate reaction. However, it has been found that below a minimum value of the furnace pressure, a reduction of the quantity of combustion air carries along with it an increase in the quantity of uncontrolled air. As long as the quantity of uncontrolled air that is determined is not noticeably influenced by a change in the quantity of combustion air, the furnace pressure is sufficiently high for a stable regulation. Below this stability limit, the nominal value SP_lambda cannot be reliably attained by means of the adaptation of the quantity of combustion air, but rather it desires a corresponding increase of the furnace pressure.

False air that enters into the furnace chamber—cases (E) and (F)—does not only lead to the greatest possible energy losses from false air, it also disturbs the thermal balance of the right and left regenerators. The attempt to compensate for such false air by means of an adaptation of the combustion air, however, leads to the increase in regenerator temperatures and to an intensification of the thermal asymmetry. The technologically appropriate response is no longer the adaptation of the combustion air, but rather the sealing of the furnace and the increase of the furnace pressure in order to prevent or to minimize the entry of false air.

The aforementioned considerations make it clear that the simple $O_2$ % measurement according to the prior art is not sufficient: only the evaluation of the oxygen balance of the firing that is present and the explicit determination of the quantity of false air plus the evaluation of the thermal trail of this false air in the regenerators make possible the online cause analysis and the selection of the technologically adapted control strategy.

The compensation of the uncontrolled air XF by means of the adaptation to the quantity of combustion air is permissible as long as a) the uncontrolled air enters directly into the furnace chamber, which is visible through a disruption in the symmetry of the regenerator temperatures and through a temperature increase of the regenerators b) the uncontrolled air XF is independent of the quantity of combustion air and in particular is not in any inversely proportional dependence to it.

Below the stability criteria that are defined in this way, the uncontrolled air XF can only be reduced by means of an increase in the furnace pressure.

Above the stability criteria that have been defined in this way, the uncontrolled air can be compensated for within wide limits by means of the automatic adaptation of the quantity of combustion air in order to maintain a preset nominal value of the excess air SP_lambda.

This ranges far beyond the "oxygen trimming" that is known from the prior art. An SPS has both the computing throughput and all process data currently available, in order to in this way operate for the "expert system" for the analysis and control of the current oxygen balance. To do so, it uses a "model" that has been left of the basic physical correlations.

Figure 2:
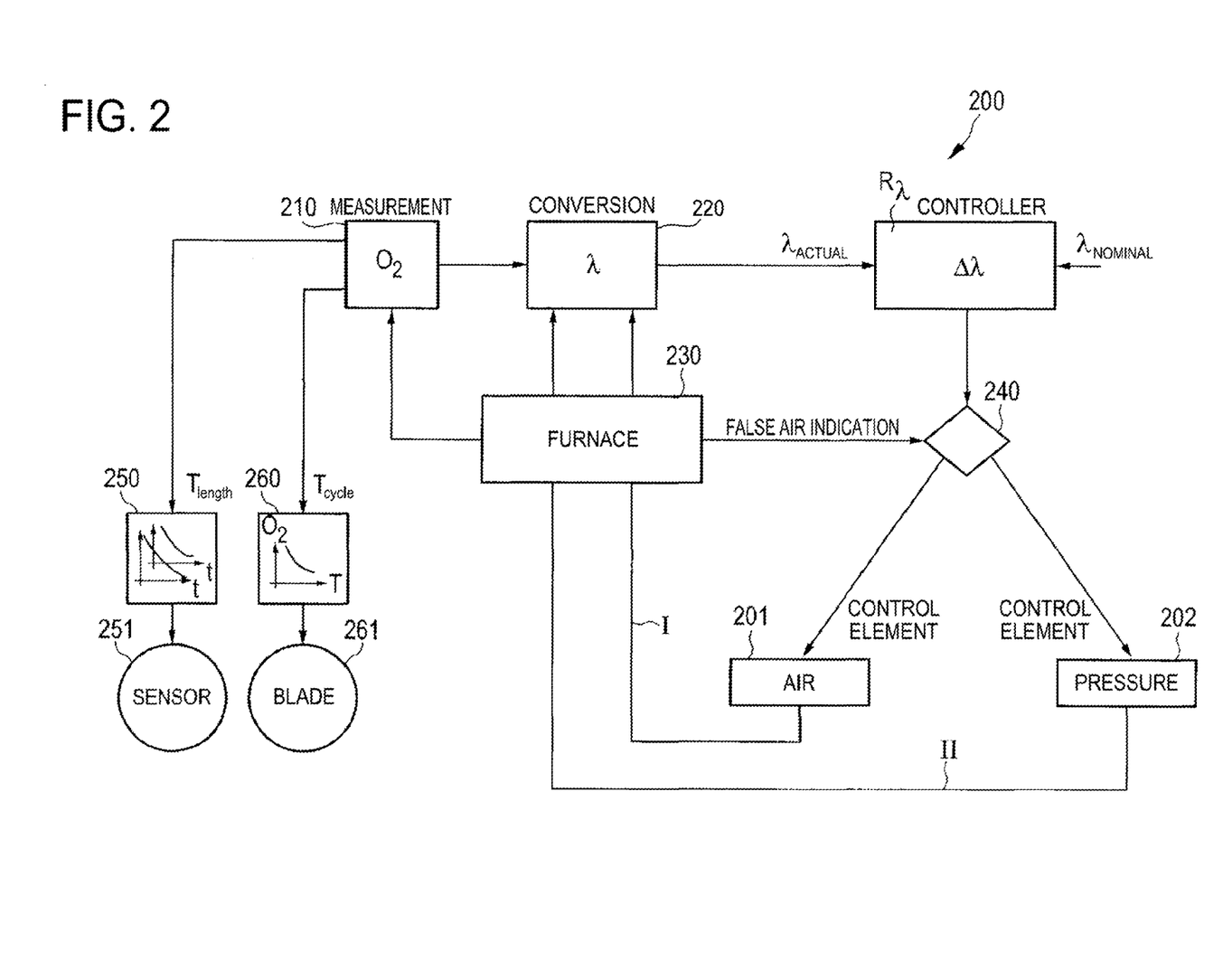
FIG. 2 shows a schematic representation of a control loop for a lambda control combined with a false air indication with the control device of FIG. 1 according to an embodiment of the invention.

FIG. 2 also depicts a suitable control scheme of an automatic regulation of the supply of combustion air of the regenerative industrial furnace 100 with a regeneratively fired glass melting tank. FIG. 2 schematically depicts a control loop that is suitable for the implementation of the method which, with suitable modules, can serve as the basis of a λ control module 200 of the control device 1000 for the implementation of the method.

The control loop of the λ control module 200 provides a measuring element 210 in the form of an exhaust gas analyzer. In this case, the exhaust gas analyzer is formulated in the form of a lambda probe 52, 52' that is depicted in FIG. 1 in each of the heads 51, 51' of the left and right regenerators 50, 50' and as a lambda probe 53 in the upper furnace 1. By means of the measuring element 210, such an oxygen content of the exhaust gas can be measured for the direct determination of an excess air value λ of the exhaust gas. The oxygen measurement value is also supplied to a calculation module 220 in which the excess air value λ is determined as a process value according to the computing rule as indicated above (PV_lambda). The excess air value λ that is determined in this way is made available to a lambda controller $R_\lambda$ of the control loop of the λ control module 200 as an actual value $\lambda_{Ist}$. With the comparison of the actual value $\lambda_{IST}$ with the preset nominal value $\lambda_{SOLL}$, the lambda controller $R_\lambda$ outputs a control deviation Δλ which is to be remedied in a regulating manner by means of the adaptation of a suitable control variable in the control path 230. It is provided in this case that the control loop of the λ control module 200 offers a selection of two control variables—having available namely, on one hand, a first control variable 201 in the form of combustion air and, on the other hand, a second control variable 202 in the form of the furnace pressure. The first control variable 201 is set with a suitable control element in a first part I of the control loop of the λ control module 200. The second control variable 202 is set in a second part II of the control loop of the λ control module 200. In this case, by means of a false air indication at the control path of the industrial furnace 100, it is determined whether false air enters in a first case upstream in or before the air-side left and/or right regenerator 50, 50' or whether false air enters in a second case downstream after the air-side left and/or right regenerator 50, 50', in particular in the furnace chamber 10. The false air indication also couples in a suitable way in particular the furnace chamber 10 and the regenerators 50, 50' with a decision module 240 of the control loop of the λ control module 200. The locations that were cited further above under (A)-(F) can also be coupled as needed with the decision module 240. For the first case, a switch is engaged by means of the decision module 240 which activates the control loop in the first part I. In the second case, a switch is engaged by means of the decision module 240 which activates the second part II of the control loop 200. As has been explained above, it is guaranteed in this way that the false air is automatically compensated for through the automatic adaptation of combustion air by means of the first control element 201 (cases (A) to (E)). For the case that the false air indication is to recognize false air downstream after the air-side left and/or right regenerator 50, 50', in particular in the furnace chamber 10 (cases (E) and (F)), then the second part of the control loop of the λ control module 200 is activated. In that case, then through a second control element 202 in the form of the blade unit 60 in the drawing off of exhaust gas that is depicted in FIG. 1, a counterpressure P to the furnace pressure p is formulated here. In this way, the furnace pressure in the control path 230 can be increased in order to compensate for the control deviation Δλ.

In addition, the control loop of the λ control module 200 has first and second measurement value run modules 250, 260 that are attached to the measuring element 210.

For example, the influence of a systematic measuring error of the combustion air stream on the determination of the uncontrolled air supply by means of the comparison of two or more states of operation with a different use of fuel can be eliminated. Within that context, the measuring of the quantity of combustion air is to be corrected in such a way that for different states of operation, the analysis of the combustion air yields equal amounts or amounts that are only slightly different of uncontrolled air flux. The measurement value run module 250 that is active over a longer time scale is capable of storing runs of the oxygen measurement value over a comparatively long period of time and of representing it as a time history over a relatively long time scale t. It has been demonstrated that, for example, a falling time history of the oxygen measurement value can be used as an indication in order to bring about an inspection by a sensor 251, for example by the lambda probes 52, 52'.

In particular, the uncontrolled air supply also includes the uncontrolled air loss. For example, this can occur by means of leaky reversing mechanisms with which a part of the combustion air enters into the exhaust gas stream in the short circuit flow. Such air losses are preferably recognized through a trend that is falling in terms of time over the duration of the regenerative cycle or a suddenly occurring strong reduction in the value of the uncontrolled air up to negative values of the same in the wake of the reversal procedure between the flame sides. The second measurement value run module 260 is correspondingly set up for a comparatively short time scale and is capable of storing oxygen measurement values at least over a cycle duration T and of representing them as a transient time history over the cycle duration. It has been demonstrated that with a repeatedly falling oxygen measurement value over the cycle duration T, it can be recognized that a blade 261, for example the blade unit 60 that is depicted in FIG. 1, is leaky between the supply of combustion air and the drawing off of exhaust gas. This concerns the false air C that is depicted in FIG. 1 as has been indicated above.

For the recognition of a possible influence of the compensation of uncontrolled air XF on the thermal symmetry of the regenerators, the output of a symmetry regulation with which the regenerator head temperatures of the left and right regenerators are aligned with each other by means of the automatic offsetting of the cycle times inventively serves to also align the vault temperatures of the melting tank for flame left and flame right with each other. In addition, the cycle duration is extended on the hotter side and is shortened on the colder side by the same amount. If the symmetry regulation can once again reduce the difference of the cycle times after the energy compensation between the two regenerators approximately to zero, and if this state of equilibrium is also achieved again and again with the active compensation of the uncontrolled air XF by means of the adaptation of the quantity of combustion air, then there is no impairment of the thermal regenerator symmetry by the false air compensation, and it is therefore completely harmless.

Figure 3:
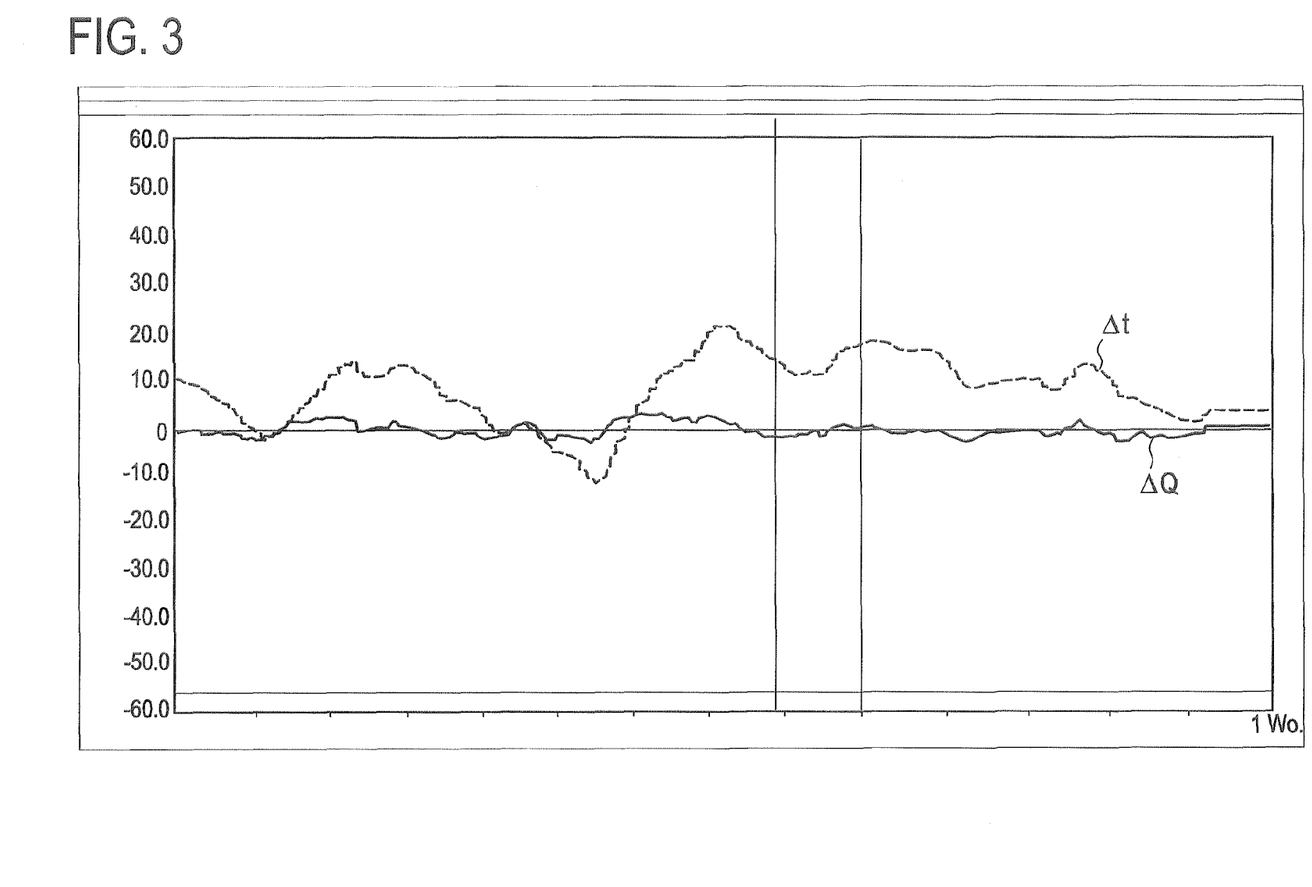
FIG. 3 shows the course in terms of time of a difference of the first preheating parameter and the second preheating parameter in the form of the corresponding heat from the preheated combustion air in symmetric state of the system, which is to a large extent steady, from the left regenerator and the right regenerator along with a time span that has been set as a heat transfer variable according to which a cycle duration for the drawing off of exhaust gas from the furnace chamber is extended for the colder regenerator and/or the cycle duration for the drawing off of exhaust gas from the furnace chamber is reduced for the hotter regenerator.

A symmetry regulator RS of the symmetry regulation module 300 in this case regulates the difference ΔQ of the quantities of heat that are shown in greater detail in FIG. 3 to zero. In addition, the symmetry regulator RS makes available to the regenerators 50, 50' a time span ±Δt with which the cycle duration t is changed for the firing of the upper furnace 1 via the regenerators 50, 50'. From FIG. 3, it is clear by way of example that for a comparatively large time period, a positive value of +Δt predominates for the left regenerator 50. Within the framework of an especially preferred evaluation module, this can be enlisted for the technological assessment of the state of the left regenerator. In this case, it is to be established that an asymmetry exists in spite of the second control circuit II.

That means that during the positive control value of the time span +Δt, the cycle duration of the firing with the left regenerator 50 has to apparently be regularly extended for the firing of the upper furnace 1—from this, an uncontrolled penetration of air can be inferred in the furnace chamber 1 or in the regenerator 50. This can be regulated by means of an adaptation of pressure in the furnace chamber 10 according to the second part II of the control loop of the λ control module 200 as has been explained above.

For the practical realization of the false air compensation by means of the adaptation of the quantity of combustion air, on the other hand, the nominal value of the quantity of combustion air is determined from:

$$SP\_air = SP\_lambda * L_{MIN} * \text{fuel} - XFA$$

whereby
SP_air is the nominal value for the quantity of combustion air
SP_lambda is the default value for the desired excess air
$L_{MIN}$ is the stoichiometric minimum quantity of air of this fuel
fuel is the maximum of the nominal value or the actual value of the quantity of fuel, and
XFA is the quantity of uncontrolled air that is to be actively compensated for.

On top of that, it has proven to be advisable that from the observation and mathematical analysis of the trend in terms of time of the quantity of uncontrolled air during the time of a firing cycle of the regenerative heating, characteristic and periodically recurring trend patterns can be determined that are used for the smoothing of the running process values of uncontrolled air and for the regulation for the future.

As an uncontrolled quantity of air that is to be actively compensated for, its current value XF is therefore not to be used, but rather a smoothed value XFA that has been determined from the analysis of previous cycles which in the simplest case [verb missing] through a weighted average from a linear course over the firing cycle and the current process value XF.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for operating a regeneratively heated industrial furnace with a furnace chamber, the method comprising:
   injecting fuel into the furnace chamber via at least one fuel injector;
   selectively alternating between providing combustion air to the furnace chamber in a first cycle duration and removing exhaust gas from the furnace chamber in a second cycle duration separately from the fuel by a left regenerator and a right regenerator that are assigned to the at least one fuel injector, the left and right regenerators being formulated for the regenerative storage of heat from the exhaust gas and the transfer of heat to the combustion air, wherein a supply of combustion air is automatically regulated by a control loop,
   wherein the control loop includes measuring an oxygen content in at least one of the left and right regenerator for a determination of an excess air value ($\lambda$) of at least one of the combustion air and of the exhaust gas, and providing the excess air value to a $\lambda$ controller of the control loop as an actual value ($\lambda_{IST}$), and
   determining the excess air value by a false air indication,
   whether false air in a first case enters upstream of at least one of the left and right regenerators, or
   whether false air in a second case enters downstream after at least one of the left and right regenerators,
   in a first part of the control loop for the first case of a false air indication, according to the output of the $\lambda$ controller by a first control element, causes a supply of combustion air to the furnace chamber to be set as a control variable, and
   in a second part of the control loop for the second case of a false air indication, according to the output of the $\lambda$ controller by a second control element, causes a furnace pressure in the furnace chamber to be set as a control variable.

2. The method according to claim 1, wherein the first control element being formulated as a choke in the supply of combustion air that is formulated for the regulation of a flow quantity of the combustion air and the second control element being formulated as a blade in the drawing off of exhaust gas that is formulated for the building up of a counterpressure to the furnace pressure.

3. The method according to claim 1, wherein the supply of combustion air being automatically regulated by a PID controller whose nominal value is formed from a product of the quantity of fuel, a stoichiometric air requirement of the fuel, and an excess air value lambda ($\kappa_{SOLL}$) that is provided as a target value, minus a quantity of an uncontrolled supply of false air from outside of the industrial furnace that is determined continuously by SP_air=SP_lambda*$L_{MIN}$*fuel−XFA, wherein:
   SP_air is the nominal value for the quantity of combustion air;
   SP_lambda is the default value for the desired excess air;
   $L_{min}$ is the stoichiometric minimum quantity of air of this fuel;
   fuel is the maximum of the nominal value or the actual value of the quantity of fuel; and
   XFA is the quantity of uncontrolled air that is to be actively compensated for.

4. The method according to claim 3, wherein the uncontrolled entry of false air being continuously determined by a combustion calculation as the basis for the exhaust gas analyzer that is working continuously of a lambda probe.

5. The method according to claim 3, wherein an excess air value lambda ($\lambda_{SOLL}$) of the combustion air that is provided as a target value divided by the fuel quantity forming a continuously corrected air-fuel ratio which is supplied to the $\lambda$ controller of the control loop according to the rule SP_air/fuel=SP_lambda*$L_{MIN}$−XFA/fuel, wherein:
   SP_air is the nominal value for the quantity of combustion air;
   fuel is the maximum of the nominal value or the actual value of the quantity of fuel;
   SP_lambda is the default value for the desired excess air;
   $L_{min}$ is the stoichiometric minimum quantity of air of this fuel; and
   XFA is the quantity of uncontrolled air that is to be actively compensated for.

6. The method according to claim 1, further comprising another control loop for a temperature regulation that includes:
   a furnace chamber temperature as a control variable,
   a first regulator for the furnace chamber temperature,
   a control element that is assigned to the first regulator, and
   a first adjustable control variable that is set in the form of at least one of a fuel stream and a combustion air stream.

7. The method according to claim 6, wherein the second control loop for a symmetry regulation concerning the left regenerator and the right regenerator includes:
   a first preheating parameter that is significant for the heat content of the combustion air of the first regenerator and a second preheating parameter that is significant for the heat content of the combustion air of the second regenerator,
   a second regulator for the difference of the first and second preheating parameters,
   a control element that is assigned to the second regulator, and
   a second adjustable control variable is set in the form of a heat transfer variable that influences the heat transfer between the first regenerator and the second regenerator.

8. The method according to claim 7, wherein the second adjustable control variable being set in the form of a heat transfer variable that influences the heat transfer between the first and second regenerator in order to restrict the amount of a difference between the first preheating parameter and the second preheating parameter within a threshold value close to zero.

9. The method according to one claim 7, wherein
   a first time span being set as the heat transfer variable by which for the hotter of the first or second regenerators, the first cycle duration is extended and/or for the colder of the first or second regenerators, the first cycle duration is shortened; and/or
   a second time span being set as the heat transfer variable by which for the colder of the first or second regenerators, the second cycle duration is extended and/or for the hotter of the first or second regenerators, the second cycle duration is shortened, wherein the first and second time spans are approximately the same amount.

10. The method according to claim 7, wherein the difference between the first preheating parameter and the second preheating parameter being used as a control result of the second control loop within the framework of the false air indication for the evaluation of an uncontrolled air penetration in the furnace chamber and/or regenerator.

11. The method according to claim 1, wherein the false air indication recognizing that false air enters downstream after at least one of the left and right regenerator for the case that on a time scale that repeatedly exceeds the cycle duration on average, a heating of the regenerator is present.

12. The method according to claim 1, wherein the fact that for a plurality of fuels that are used simultaneously, air ratios are formulated in such a way that they are in a relationship to each other of the stoichiometric air requirement of each of the fuels, in order to maintain the unchanged oxygen supply with a change in the percentage of these fuels.

13. A method according to claim 1, wherein the fact that within the framework of the false air indication from the observation and/or analysis of the trend in terms of time of the quantity of uncontrolled air during the time of a firing cycle of the regenerative heating, characteristic and periodically recurring trend patterns are determined and used for the smoothing of the running process values of uncontrolled air and for the regulation for the future.

14. The method according to claim 1, wherein a minimum value of the furnace pressure being maintained as a stability limit, whereby if the value drops below the stability limit, a reduction in the combustion air stream leads to a higher drawing off of uncontrolled air, while for the furnace pressure values above the stability limit, the uncontrolled air is not affected or is only insignificantly influenced by a combustion air stream of a different degree.

15. The method according to claim 1, wherein a minimum quantity of the regulated combustion air stream being limited in such a way that a temperature of the air-side regenerator remains below a preset temperature threshold value.

16. The method according to claim 1, wherein the furnace chamber comprises a melting tank for glass.

17. A control device in an industrial furnace having a left and a right regenerator and a furnace chamber, the control device comprising:
an exhaust gas analyzer configured to measure an oxygen content for determining an excess air value ($\lambda$) of at least one of combustion air and exhaust gas;
a $\lambda$ control module configured to receive the excess air value as an actual value ($\lambda_{IST}$);
a false air indication module configured to determine whether false air in a first case enters upstream in or before at least one of the left and right regenerators or whether false air in a second case enters downstream after at least one of the left and right regenerators; and a branch module that is formulated to:
in a first part of a control loop for the first case of a false air indication, according to the output of the $\lambda$ control module by a first control element, a supply of combustion air to the furnace chamber being set as a first control variable, and
in a second part of the control loop for the second case of a false air indication, according to the output of the $\lambda$ control module by a second control element, a furnace pressure in the furnace chamber being set as a second control variable.

18. The control device according to claim 17 further comprising:
a temperature regulation module for a first control loop that includes:
a furnace chamber temperature as a control variable, and
a first regulator configured to control the furnace chamber temperature, and
a control element that is assigned to the first regulator, wherein a first adjustable control variable is configured be set in the form of at least one of a fuel stream and a combustion air stream, and a symmetry regulation module concerning the left regenerator and the right regenerator for a second control loop that includes:
a first preheating parameter that is significant for the heat content of the combustion air of the first regenerator and a second preheating parameter that is significant for the heat content of the combustion air of the second regenerator, and
a second regulator for determining the difference of the first and second preheating parameters, and
a control element that is assigned to the second regulator, a second adjustable control variable is set in the form of a heat transfer variable that influences the heat transfer between the first regenerator and the second regenerator.

19. A regeneratively heated industrial furnace with a furnace chamber comprising:
at least one fuel injector for the injecting of fuel into the furnace chamber that is formulated for the injection of fuel substantially without combustion air,
a left regenerator and a right regenerator assigned to at least one fuel injector that are formulated for the regenerative storage of heat from the exhaust gas and for the transfer to the combustion air for the periodically alternating leading of, on one hand, combustion air to the furnace chamber in a first cycle duration and, on the other hand, exhaust gas from the furnace chamber in a second cycle duration separately from fuel, and
a control device according to claim 17.

20. The control device according to claim 17, wherein the furnace chamber comprises a melting tank for glass.

21. A method for the regulated operation of a regeneratively heated industrial furnace with a furnace chamber, with a melting tank for glass, the method comprising:
injecting fuel into the furnace chamber via at least one fuel injector that is configured to inject fuel substantially without combustion air,
periodically alternating leading, on one hand, combustion air to the furnace chamber in a first cycle duration and, on the other hand, exhaust gas from the furnace chamber in a second cycle duration separately from the fuel by a left regenerator and a right regenerator that are assigned to at least one fuel injector that is configured for the regenerative storage of heat from the exhaust gas and the transfer of heat to the combustion air, wherein a supply of combustion air is automatically regulated by a control loop,
wherein the control loop includes measuring an oxygen content in at least one of the left and right regenerator for a determination of an excess air value ($\lambda$) of at least one of the combustion air and of the exhaust gas, and providing the excess air value to a $\lambda$ controller of the control loop as an actual value ($\lambda_{IST}$), and
determining the excess air value by a false air indication,
whether false air in a first case enters upstream of at least one of the left and right regenerators, or
whether false air in a second case enters downstream after at least one of the left and right regenerators,
in a first part of the control loop for the first case of a false air indication, according to the output of the $\lambda$ controller by a first control element, causes a supply of combustion air to the furnace chamber to be set as a control variable, and
in a second part of the control loop for the second case of a false air indication, according to the output of the $\lambda$ controller by a second control element, causes a furnace pressure in the furnace chamber to be set as a control variable.

* * * * *